US012699842B2

(12) United States Patent
Shim et al.

(10) Patent No.: US 12,699,842 B2
(45) Date of Patent: Aug. 4, 2026

(54) TEXT-BASED RELATION EXTRACTION METHOD AND DEVICE

(71) Applicant: Seoul National University R&DB Foundation, Seoul (KR)

(72) Inventors: Kyu Seok Shim, Seoul (KR); Woo Hwan Jung, Seoul (KR)

(73) Assignee: Seoul National University R&DB Foundation, South (KR)

( * ) Notice: Subject to any disclaimer, the term of this patent is extended or adjusted under 35 U.S.C. 154(b) by 495 days.

(21) Appl. No.: 18/279,415

(22) PCT Filed: Nov. 23, 2021

(86) PCT No.: PCT/KR2021/017302
§ 371 (c)(1),
(2) Date: May 9, 2024

(87) PCT Pub. No.: WO2022/191379
PCT Pub. Date: Sep. 15, 2022

(65) Prior Publication Data
US 2024/0303436 A1 Sep. 12, 2024

(30) Foreign Application Priority Data

Mar. 10, 2021 (KR) ........................ 10-2021-0031472

(51) Int. Cl.
$G06F\ 40/289$ (2020.01)
$G06F\ 40/279$ (2020.01)
$G06N\ 5/022$ (2023.01)
$G06N\ 20/00$ (2019.01)

(52) U.S. Cl.
CPC .......... $G06F\ 40/289$ (2020.01); $G06F\ 40/279$ (2020.01); $G06N\ 5/022$ (2013.01); $G06N\ 20/00$ (2019.01)

(58) Field of Classification Search
None
See application file for complete search history.

(56) References Cited

U.S. PATENT DOCUMENTS

| | | | |
|---|---|---|---|
| 2020/0097597 A1* | 3/2020 | Lourentzou | G06N 7/01 |
| 2020/0134422 A1* | 4/2020 | Gliozzo | G06N 3/09 |
| 2021/0026920 A1 | 1/2021 | Kar et al. | |

(Continued)

FOREIGN PATENT DOCUMENTS

| | | |
|---|---|---|
| CN | 111027324 A | 4/2020 |
| JP | 2008226168 A | 9/2008 |
| KR | 1020190038258 A | 4/2019 |

(Continued)

OTHER PUBLICATIONS

International Search Report for International Application No. PCT/KR2021/0017302, dated Feb. 22, 2022, 3 pages.

(Continued)

*Primary Examiner* — Antim G Shah
(74) *Attorney, Agent, or Firm* — Cesari and McKenna, LLP

(57) ABSTRACT

Provided are a method and an apparatus for relation extraction from a text. According to an embodiment, relation information is extracted from the text by using both a noisy label and an accurate label. As a result, relation extraction accuracy is improved.

17 Claims, 5 Drawing Sheets

(56) References Cited

U.S. PATENT DOCUMENTS

2023/0100376 A1*  3/2023  Liu ........................ G06F 40/30
                                             704/9

FOREIGN PATENT DOCUMENTS

KR        102223382 B1    3/2021
KR        102365433 B1    2/2022

OTHER PUBLICATIONS

W. Jung and K. Shim, "Dual Supervision Framework for Relation Extraction with Distant Supervision and Human Annotation," arXiv:2011.11851 [cs.CL], Nov. 24, 2020, available at https://arxiv.org/pdf/2011.11851.pdf, 14 pages.
Written Decision on Registration for Korean Patent Application No. 10-2021-0162573, Dec. 12, 2024, 3 Pages, Korean Intellectual Property Office.

* cited by examiner

IN_TXT

100

$\langle e_h,\ r,\ e_t \rangle$

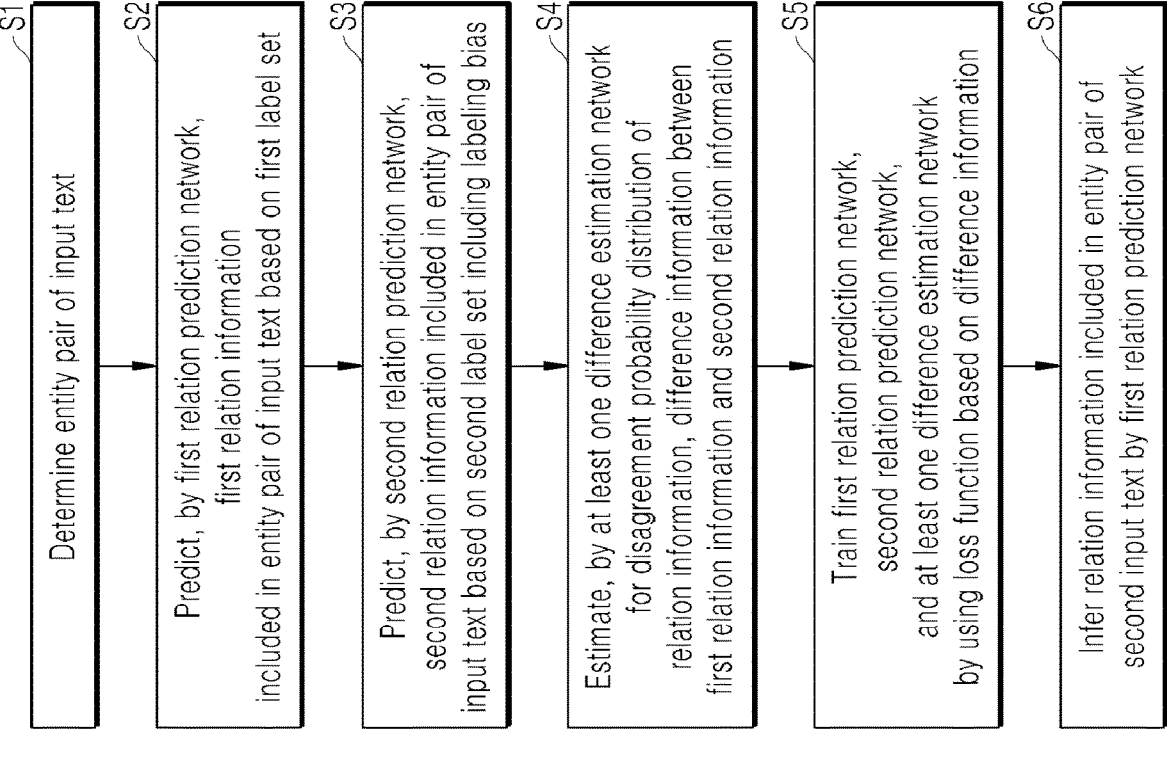

S1 — Determine entity pair of input text

S2 — Predict, by first relation prediction network, first relation information included in entity pair of input text based on first label set S3 — Predict, by second relation prediction network, second relation information included in entity pair of input text based on second label set including labeling bias S4 — Estimate, by at least one difference estimation network for disagreement probability distribution of relation information, difference information between first relation information and second relation information S5 — Train first relation prediction network, second relation prediction network, and at least one difference estimation network by using loss function based on difference information S6 — Infer relation information included in entity pair of second input text by first relation prediction network

FIG. 5

TEXT-BASED RELATION EXTRACTION METHOD AND DEVICE

RELATED APPLICATIONS

This application claims priority to International Patent Application No. PCT/KR2021/017302, filed Nov. 23, 2021, which claims priority to Korean Patent Application No. 10-2021-0031472, filed on Mar. 10, 2021, the entirety of each of which is incorporated by reference herein.

TECHNICAL FIELD

The present invention relates to a method and an apparatus for relation extraction from a text, and particularly, to a method and an apparatus for extracting relation information from a text by using both a noisy label and an accurate label.

BACKGROUND ART

Hereinafter, described contents will be only described for the purpose of providing background information related to an embodiment of the present invention, and the described contents are not natural to form the prior art.

With the development of artificial intelligence technology, artificial intelligence and deep learning technology are widely used in relation extract (RE). The relation extraction refers to a technology of extracting formal information by identifying a relationship between entities in a text.

For example, as a result of the relation extraction from a text "Bill Gates is the founder of Microsoft", formal information <Microsoft, Founder, Bill Gates> may be obtained. Here, 'Microsoft' and 'Bill Gates' are entities, and 'Founder' is relation information.

Training data for a relation extraction model largely includes human annotated data having high accuracy and distantly supervised data having relatively low accuracy.

In a conventional method for training a relation extraction deep learning model by using the human annotated label and the distantly supervised label, the relation extraction deep learning model is first trained with the distantly supervised label and a relation extraction result is minutely adjusted by using only statistical information of the human annotated label.

This has a problem in that a small amount of accurate data is just indirectly used through the statistical information. Further, in the conventional scheme, since human annotated data is not directly utilized for model training, it is difficult to expect additional performance enhancement in spite of an increase in the amount of the human annotated data.

Meanwhile, there is also a case where the data created by using the distant supervising is accurate and there is also a case where the data includes an error, but when an error factor for the distant supervising is fixedly applied, there is a limit that characteristics of actual data cannot be sufficiently reflected.

The aforementioned prior art as technical information which the inventors possess for deriving the present invention or acquires during a derivation process may not particularly be called known art opened to general public before application of the present invention.

DISCLOSURE OF INVENTION

Technical Problem

An object of the present invention which is to overcome the aforementioned limit is to provide a method and an apparatus for relation extraction, which can directly use human annotated data for training a relation extraction model.

An object of the present invention is to provide a method and an apparatus for relation extraction, which are capable of dynamically modeling a difference between distantly supervised data and the human annotated data according to a context.

The objects of the present invention are not limited to the above-mentioned objects, and other objects and advantages of the present invention that are not mentioned can be understood by the following description, and will be more clearly understood by embodiments of the present invention. Further, it will be appreciated that the objects and advantages of the present invention can be realized by means and combinations shown in the claims.

Solution to Problem

A method for relation extraction according to an embodiment may include: predicting, by a first relation prediction network, first relation information included in an entity pair of an input text based on a first label set for pre-defined relation information; predicting, by a second relation prediction network, second relation information included in the entity pair of the input text based on a second label set including a labeling bias for the pre-defined relation information; estimating, by at least one difference estimation network for a disagreement probability distribution of relation information, difference information between the first relation information and the second relation information; and training the first relation prediction network, the second relation prediction network, and the at least one difference estimation network by using a loss function based on the difference information.

An apparatus for relation extraction according to an embodiment may include: a processor; and a memory operably connected to the processor and storing at least one code performed by the processor, in which when the memory is executed through the processor, the memory stores a code which allows the processor to predict, by a first relation prediction network, first relation information included in an entity pair of an input text based on a first label set for pre-defined relation information, predict, by a second relation prediction network, second relation information included in the entity pair of the input text based on a second label set including a labeling bias for the pre-defined relation information, estimate, by at least one difference estimation network for a disagreement probability distribution of relation information, difference information between the first relation information and the second relation information, and train the first relation prediction network, the second relation prediction network, and the at least one difference estimation network by using a loss function based on the difference information.

Other aspects, features, and advantages other than those described above will become apparent from the following drawings, claims, and detailed descriptions of the invention.

Advantageous Effects of Invention

According to an embodiment, human annotated data can be directly used for training a relation extraction model.

According to an embodiment, a difference between distantly supervised data and the human annotated data can be dynamically modeled according to a context.

The effects of the present invention are not limited to the aforementioned effects, and other objects, which are not mentioned above, will be clearly appreciated by a person having ordinary skill in the art from the following description.

BRIEF DESCRIPTION OF DRAWINGS

The foregoing and other objects, features, and advantages of the invention, as well as the following detailed description of the embodiments, will be better understood when read in conjunction with the accompanying drawings. For the purpose of illustrating the invention, there is shown in the drawings an exemplary embodiment that is presently preferred, it being understood, however, that the invention is not intended to be limited to the details shown because various modifications and structural changes may be made therein without departing from the spirit of the invention and within the scope and range of equivalents of the claims. The use of the same reference numerals or symbols in different drawings indicates similar or identical items.

FIG. 5 is a flowchart of a method for relation extraction according to an embodiment.

MODE(S) FOR CARRYING OUT THE INVENTION

Figure 1:
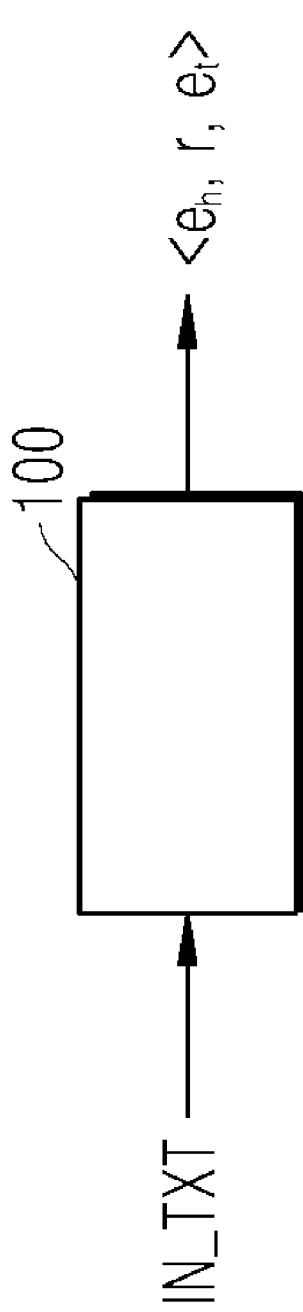
FIG. 1 is a diagram for schematically describing relation extraction from a text according to an embodiment.

Hereinafter, the present invention will be described in more detail with reference to the drawings. The present invention may be implemented in various different forms and is not limited to exemplary embodiments described herein. Hereinafter, in the embodiment, in order to clearly describe the present invention, a part that does not have a direct relationship with the description is omitted, but in implementing a device or system in which the spirit of the present invention is applied, it does not mean that the configuration omitted as such is not required. Moreover, through this specification, the same or similar component is represented by the same reference numeral.

In the following description, terms including first, second, and the like are used for describing various constituent elements, but the constituent elements are not limited by the terms and the terms are used only for distinguishing one constituent element from other constituent elements. Further, in the following description, a singular form may include a plural form if there is no clearly opposite meaning in the context.

In the following description, it should be understood that a term "include" or "have" indicates that a feature, a number, a step, an operation, a component, a part, or the combination thereof described in the specification is present, but does not exclude a possibility of presence or addition of one or more other features, numbers, steps, operations, components, parts, or combinations thereof, in advance.

Training data for a relation extraction model may be largely divided into two types, i.e., human annotated data and distantly supervised data.

The human annotated data has high accuracy, but has a disadvantage in that it is difficult to secure a large amount of training data due to a cost problem. As a result, there are many cases in which the large amount of training data is automatically created and utilized by utilizing distant supervising. However, the distantly supervised data tends to be low in accuracy.

The present invention provides a technology for efficiently training a deep learning model for relation extraction by using a large amount of data which is comparatively inaccurate, which is automatically created and a small amount of data which is comparatively accurate, which is created by the human.

According to the present invention, the human annotated data is directly used for training, and performance degradation due to the inaccurate data is prevented while a small amount of accurate data is directly used to lead to higher performance enhancement. Further, a difference between the distantly supervised data and the human annotated data can be dynamically modeled according to a context.

Hereinafter, the present invention will be described in detail with reference to the drawings.

FIG. 1 is a diagram for schematically describing relation extraction from a text according to an embodiment.

A relation extraction apparatus 100 according to an embodiment outputs relation information included in an input text IN_TXT. For example, the relation extraction apparatus 100 outputs relation information between entities of the input text IN_TXT.

Here, the input text IN_TXT may be a sentence or a document including at least one sentence. The entity means, for example, a component of the sentence such as a subject, a predicative, an object, and a complement.

The relation extraction apparatus 100 according to an embodiment extracts a relation included in the input text IN_TXT in a form of formal information. That is, the relation information is expressed as a formal form.

In an example, the relation extraction apparatus 100 outputs a relation extraction result in a formal form of triple $<e_h, r, e_t>$ including an entity pair including a head entity $<e_h>$ and a tail entity $<e_t>$ extracted from the input text IN_TXT, and relation information $<r>$ included in the entity pair.

For example, the head entity <eh> corresponds to the subject of the sentence and the tail entity <et> corresponds to the object of the sentence. For example, the head entity <eh> corresponds to a first noun of the sentence and the tail entity <et> corresponds to a last noun of the sentence. For example, the relation information $<r>$ may be associated with the predicative of the sentence.

For example, the relation information $<r>$ includes a probability value of at least one candidate relation which may be included in the entity pair. That is, the relation information $<r>$ may be expressed as a vector having a probability value that the given entity pair will be each candidate relation as an element, and in this case, the relation information $<r>$ is expressed as a vector having a dimension which is as large as the number of one or more candidate relations.

In an example, the relation extraction apparatus 100 may extract at least one entity pair for every sentence of the input text IN_TXT, and output the relation information included in each extracted entity pair.

The relation extraction apparatus 100 may be implemented as a server or a terminal.

The relation extraction apparatus 100 may receive the input text and/or the training data from a plurality of terminals or other servers, and train the relation extraction model based thereon. In another example, the relation extraction apparatus 100 may receive the relation extraction model trained in an external device.

The relation extraction apparatus 100 may infer the relation information included in the input text by executing the relation extraction model.

The relation extraction apparatus 100 may provide, to an external device including the terminal, the relation information output from the relation extraction model. The relation extraction apparatus 100 may provide, to the external device including the terminal, the trained relation extraction model.

Figure 2:
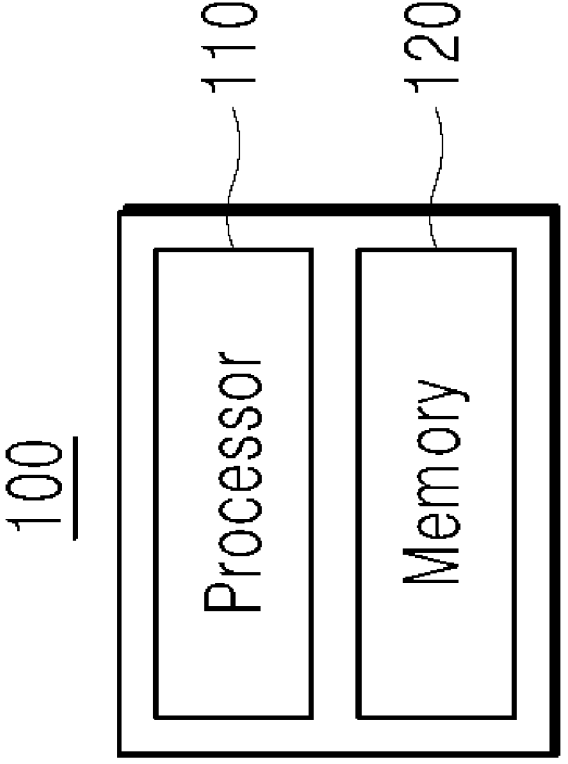
FIG. 2 is a block diagram of an apparatus for relation extraction from a text according to an embodiment.

FIG. 2 is a block diagram of an apparatus for relation extraction from a text according to an embodiment.

The relation extraction apparatus 100 according to an embodiment includes a processor 110 and a memory 120.

The processor 110 as a kind of central processing unit may control an operation of the relation extraction apparatus 100 by executing one or more commands stored in the memory 120.

The processor 110 includes all types of devices capable of processing data. The processor 110 may mean, for example, a data processing device embedded in hardware, which has a physically structured circuit in order to perform a function expressed by a code or a command included in the program.

An example of the data processing device embedded in the hardware may include a processing device such as a microprocessor, a central processing unit (CPU), a processor core, a multiprocessor, an application-specific integrated circuit (ASIC), a field programmable gate array (FPGA), or a graphics processing unit (GPU), but is not limited thereto. The processor 110 may include one or more processors.

The memory 120 is operatively connected to the processor 110 and stores at least one code performed in the processor 110.

The memory 120 may store a program including one or more commands for extracting the relation from the input text IN_TXT. The processor 110 may execute a text-based relation extraction process according to an embodiment based on the programs and commands stored in the memory 120.

The memory 120 may store the relation extraction model for implementing the relation extraction according to an embodiment. The relation extraction model will be described below with reference to FIGS. 3 and 4.

The memory 120 may further store intermediate data, an operation result, and the like generated in the process of executing the method for extracting the relation extraction from the text according to an embodiment. The memory 120 may store training data, intermediate data, and result data of the relation extraction model. For example, the training data of the relation extraction model includes a first labeling data set for predefined relation information to be described below with reference to FIG. 5 and a second labeling data set including a labeling bias for the predefined relation information.

The memory 120 may include an internal memory and/or an external memory, and may include a volatile memory such as a DRAM, an SRAM, or an SDRAM, a non-volatile memory such as a One Time Programmable Read Only Memory (OTPROM), a Programmable Read Only Memory (PROM), an Erasable PROM (EPROM), an Electrically Erasable PROM (EEPROM), a mask ROM, a flash ROM, a NAND flash memory, or a NOR flash memory, a flash drive such as a solid state drive (SSD), a compact flash (CF) card, an SD card, a micro-SD card, a mini-SD card, an Xd card, or a memory stick, or a storage device such as a hard disk drive (HDD). The memory 120 may include magnetic storage media or flash storage media, but is not limited thereto.

Additionally, the relation extraction apparatus 100 may further include a communication unit (not illustrated) performing data transmission and reception to and from the external device.

For example, the relation extraction apparatus 100 may receive information for execution of the relation extraction model such as an initial weight, a hyperparameter, and a loss function of the relation extraction model through the communication unit, and store the received information in the memory 120. For example, the relation extraction apparatus 100 may receive a human annotated label and/or a distantly supervised label through the communication unit, and store the received label in the memory 120. For example, the relation extraction apparatus 100 may receive the input text IN_TXT or a feature vector corresponding to the entity pair extracted from the input text IN_TXT from the external device through the communication unit.

The relation extraction apparatus 100 executes the method for relation extraction from the text according to an embodiment. That is, the relation extraction apparatus 100 according to an embodiment extracts the relation information included in at least one entity pair included in the input text IN_TXT by executing the relation extraction model. Hereinafter, the operation of the relation extraction apparatus 100 for executing the relation extraction method according to an embodiment will be schematically described, and a specific operation will be described below with reference to FIG. 5.

When the memory 120 is executed through the processor 110, the memory 120 may store a code configured to allow the processor 110 to predict first relation information included in the entity pair of the input text IN_TXT by a first relation prediction network based a first label set for predefined relation information, predict second relation information included in the entity pair of the input text IN_TXT by a second relation prediction network based on a second label set including a labeling bias for the predefined relation information, estimate difference information between first relation information and second relation information by at least one difference estimation network for a disagreement probability distribution of the relation information, and train the first relation prediction network, the second relation prediction network, and the at least one difference estimation network by using a loss function based on the estimated difference information. This will be described below with reference to steps S2 to S5 of FIG. 5.

Here, the code means a code executable, a program executable, a file executable, or a series of commands executable by the processor 110.

In an example, the first label set includes a human annotated label and the second label set includes a distantly supervised label.

Further, for example, the loss function may include a loss term for the difference information between the first relation information and the second relation information, and the loss term for the difference information may be defined as a function based on a ratio and the difference information between the first relation information and the second relation information.

In an example, the entity pair of the input text IN_TXT may correspond to a combination of the head entity and the tail entity, and when the memory 120 is executed through the processor 110, the memory 120 may store a code configured to allow the processor 110 to determine a word corresponding to the head entity and a word corresponding to the tail entity among a series of words of the input text IN_TXT by executing a feature encoder.

When the memory 120 is executed through the processor 110, the memory 120 may store a code configured to allow the processor 110 to determine the loss function based on the type of label for the relation information included in the entity pair of the input text IN_TXT.

In an example, a disagreement probability distribution for the relation information is a log normal distribution for the ratio of the first relation information and the second relation information, and at least one difference estimation network includes a first difference estimation network for an average of the log normal distribution and a second difference estimation network for a standard deviation for the log normal distribution.

For example, at least one command stored in the memory 120 may store a code executed by the processor 110 and configured to allow the processor 110 to estimate the relation information included in the entity pair of the second input text by the trained first relation prediction network.

Hereinafter, the relation extraction model provided in an embodiment will be described with reference to FIGS. 3 and 4.

Figure 3:
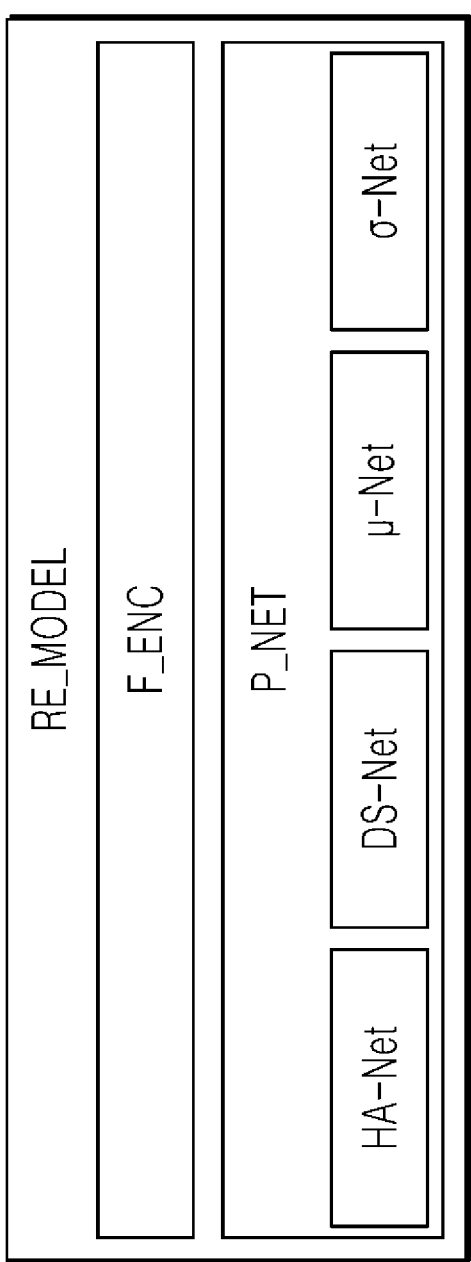
FIG. 3 is a block diagram of a relation extraction model according to an embodiment.

FIG. 3 is a block diagram of a relation extraction model according to an embodiment.

The relation extraction model RE_MODEL outputs relation information predicted as a most prominent relationship for the entity pair of the input text IN_TXT. Here, the output relation information may be the formal form such as triple.

The relation extraction model RE_MODEL includes a feature encoder F_ENC that acquires the entity pair which is a target of the relation extraction from the input text IN_TXT. The feature encoder F_ENC may parse the input text IN_TXT by various natural language processing schemes, and output a word which becomes the relation extraction target among a series of words included in the input text IN_TXT, i.e., the entity pair.

The feature encoder F_ENC extracts the entity pair from the input text IN_TEXT in the form of the feature vector. The entity pair output by the feature encoder F_ENC includes the head entity $e_h$ and the tail entity et.

In an example, the feature encoder F_ENC may output the feature vector corresponding to each of the head entity $e_h$ and the tail entity et. For example, the feature vector may be a one-hot vector expressed in a one-hot encoding scheme for a vocabulary of a language to which the input text IN_TXT belongs, and is not limited thereto, and may be expressed by various vectorization techniques.

In an example, the entity pair output from the feature encoder F_ENC of the relation extraction model RE_MODEL is input into a prediction network P_NET to be described below.

In another example, the relation extraction model RE_MODEL may use the feature vector corresponding to a pre-extracted entity pair as an input of the prediction network P_NET.

That is, the relation extraction apparatus 100 inputs an entity pair pre-extracted and stored in the memory 120 or pre-extracted and received from the external device by communication with the external device to extract the relation information included in the relevant entity pair instead of extracting the entity pair from the input text IN_TXT through the feature encoder F_ENC. In this case, the relation extraction model RE_MODEL excludes the feature encoder F_ENC, and includes the prediction network P_NET in FIG. 3.

The relation extraction model RE_MODEL includes the prediction network P_NET for predicting the relation information of the entity pair of the input text IN_TXT. The prediction network P_NET outputs a probability distribution of a relationship between entities.

The prediction network P_NET includes a first relation prediction network HA-Net, a second relation prediction network DS-Net, and at least one difference estimation network u-Net and o-Net for difference between first relation information predicted by the first relation prediction network HA-Net and second relation information predicted by the second relation prediction network DS-Net.

In FIG. 3, two difference estimation networks u-Net and o-Net are exemplarily illustrated, but the relation extraction model RE_MODEL may include fewer or more difference estimation networks. That is, the relation extraction model RE_MODEL may include at least one difference estimation network configured according to a parameter for a disagreement probability distribution of the relation information between the first relation information and the second relation information.

The first relation prediction network HA-Net, second relation prediction network DS-Net, and at least one difference estimation network u-Net and o-Net of the prediction network P_NET as sub networks of the prediction network P_NET may be constituted by networks having the same structure. In an example, the first relation prediction network and the second relation prediction network may share an initial weight with each other.

The relation extraction model RE_MODEL separately trains the first relation prediction network HA-Net using the human annotated training data for training and the second relation prediction network DS-Net using distantly supervised training data for training.

That is, the relation extraction method according to an embodiment separately constitutes the prediction network P_NET by the first relation prediction network HA-Net and the second relation prediction network DS-Net, and trains the first relation prediction network HA-Net and the second relation prediction network DS-Net by using the human annotated label and the distantly supervised label, respectively.

Meanwhile, after the training is completed, an inference process uses an output of the first relation prediction network HA-Net. That is, a second input text which is an actual relation extraction target is input into the feature encoder F_ENC to extract the feature vector of the entity pair and the extracted feature vector is input to provide the relation information output by executing the first relation prediction network HA-Net as a result of relation extraction for the second input text.

In an example, in the relation extraction model RE_MODEL, a loss term based on a difference between the outputs of the first relation prediction network HA-Net and the second relation prediction network DS-Net is included in a loss function for training the relation extraction model RE_MODEL. As a result, a result in which the first relation prediction network HA-Net is also trained by training the second relation prediction network DS-Net by the distantly supervised label may be obtained.

Further, the relation extraction model RE_MODEL includes at least one difference estimation network u-Net and o-Net for a difference between prediction results of the first and second relation prediction networks HA-Net and DS-Net to adjust a degree of using different types of training data for training the relation extraction model, thereby dynamically modeling the difference between the first relation prediction network HA-Net and the second relation prediction network DS-Net according to the context.

The relation extraction model RE_MODEL is applicable to various deep learning-based relation extraction models in which specific network configurations of the feature encoder F_ENC and the prediction network P_NET are different. That is, the relation extraction model RE_MODEL is applicable to a deep learning-based relation extraction model having a unit prediction network which predicts a relation from an output feature vector of the feature encoder, and in this case, is applicable regardless of the specific network structures of the feature encoder and the unit prediction network.

For example, the relation extraction model RE_MODEL constitutes the first relation prediction network HA-Net, the second relation prediction network DS-Net, and at least one difference estimation network u-Net and o-Net based on the unit prediction network to provide a framework applicable to various deep learning-based relation extraction models.

Meanwhile, when the input text IN_TXT is the sentence, since sentence-level relation extraction is a multi-class classification task, a sentence-level relation extraction model may utilize a softmax classifier for the relation prediction networks HA-Net and DS-Net, and use a categorical cross entropy as the loss function.

When the input text IN_TXT is a document, document-level relation extraction may use a sigmoid classifier and a binary cross entropy as the relation prediction networks HA-Net and DS-Net and the loss function, respectively.

Figure 4:
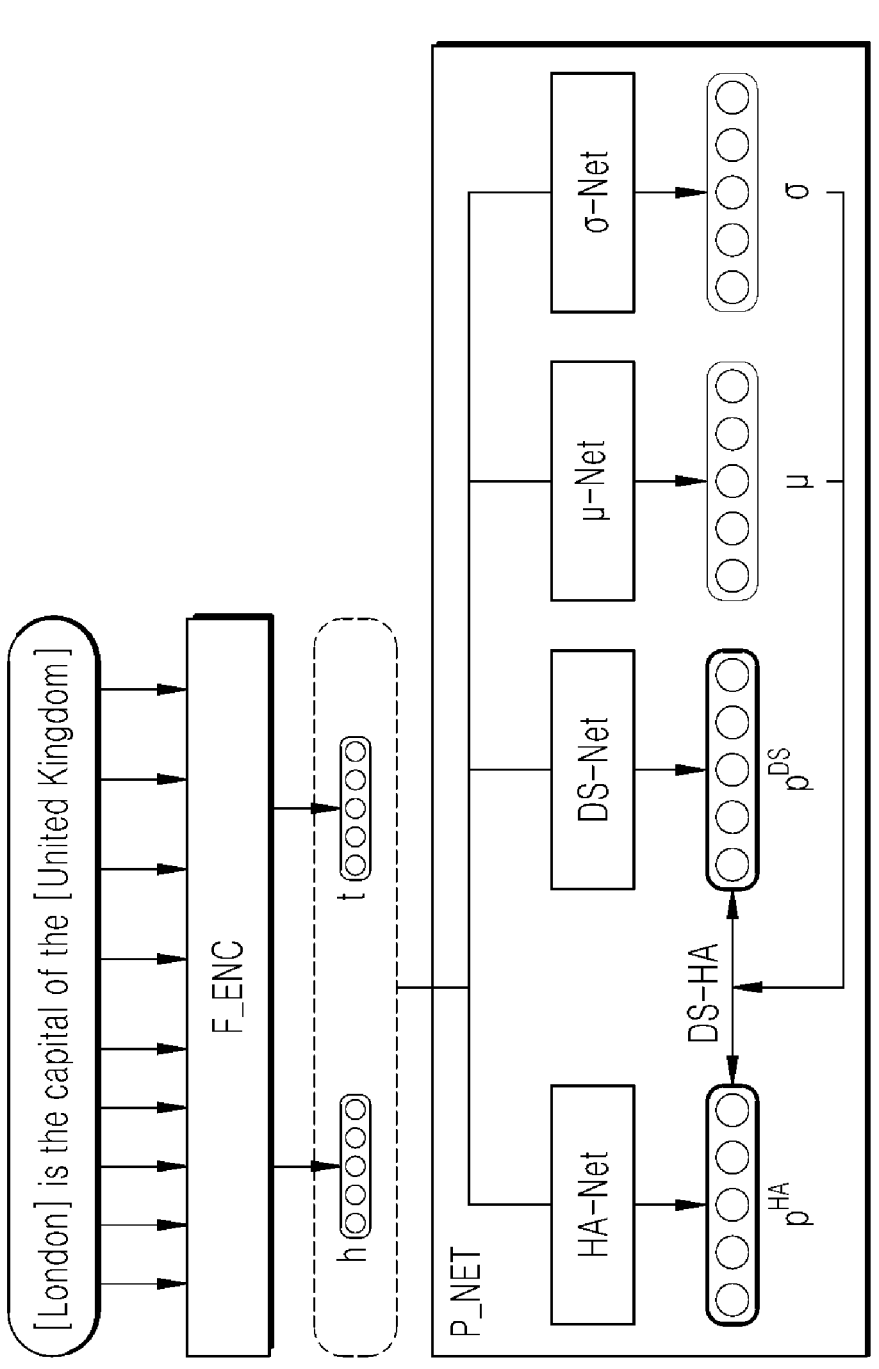
FIG. 4 is a diagram for describing an operation of a relation extraction model in a method for relation extraction according to an embodiment.

FIG. 4 is a diagram for describing an operation of a relation extraction model in a method for relation extraction according to an embodiment.

The relation extraction model RE_MODEL includes the feature encoder F_ENC and the prediction network P_NET receiving the input text IN_TXT.

The prediction network P_NET is constituted by the relation prediction networks HA-Net and DS-Net for estimating labels created by two schemes, and difference estimation networks u-Net and o-Net for estimating the relationship between the outputs of two relation prediction networks HA-Net and DS-Net.

Two relation prediction networks HA-Net and DS-Net perform training by a scheme of estimating different types of data, human annotated data and distantly supervised data, i.e., a label (human annotated label) created by a scheme having high accuracy and a label (distantly supervised label) created by a scheme having low accuracy, respectively.

The difference estimation networks u-Net and o-Net make two relation prediction networks HA-Net and DS-Net affect mutual training by estimating the difference between the outputs of two relation prediction networks HA-Net and DS-Net.

Meanwhile, it is described that the relation prediction networks HA-Net and DS-Net include two relation prediction networks, but this is exemplary, and according to the type of label, the prediction network P_NET may include more relation prediction networks and a difference estimation network for estimating the difference therebetween.

The relation extraction method according to an embodiment is applicable to the prediction network P_NET having various structures, and provides a relation extraction model training method capable of improving a relation extraction performance. That is, the relation extraction model RE_MODEL according to an embodiment and the relation extraction method using the same provide a relation extraction model configuring technique applicable to various types of relation prediction networks and a training method thereof.

For example, the relation prediction network is dualized into two relation prediction networks and configured in a dual structure of the same network model, and the difference estimation network is additionally arranged to configure the prediction network P_NET and to be trained according to the relation estimation method according to an embodiment.

As a result, regardless of the specific model of the relation prediction network constituting the prediction network P_NET, the relation extraction model is reconfigured by dualization of the relevant relation prediction network and addition of the difference estimation network, and the relation extraction method according to an embodiment is applicable.

FIG. 4 exemplarily illustrates the relation extraction process of the relation extraction model RE_MODEL of FIG. 3.

The feature encoder F_ENC extracts the feature vector of the entity pair from the input text IN_TEXT. h of FIG. 4 represents the feature vector of the head entity <eh> and t represents the feature vector of the tail entity <et>.

When the exemplary input text IN_TXT is assumed as 'London is the capital of the United Kingdom', the feature encoder F_ENC extracts [London] which is a first noun of the sentence as the head entity <eh> and [United Kingdom] which is a last noun as the tail entity <et>, and determines the feature vector h corresponding to [London] and the feature vector t corresponding to [United Kingdom].

The prediction network P_NET includes the first relation prediction network HA-Net, the second relation prediction network DS-Net, and at least one difference estimation network u-Net and o-Net as described with reference to FIG. 3.

The feature vectors h and t of the entity pair of the input text IN_TXT are input into the first relation prediction network HA-Net, the second relation prediction network DS-Net, and the at least one difference estimation network u-Net and o-Net.

The first relation prediction network HA-Net predicts relation information $P^{HA}$ for the head entity <eh> expressed by the feature vector h and the tail entity <et> expressed by the feature vector t.

The relation information $P^{HA}$ is a IRI-dimensional vector defined for a relation set R having a potential relation between the head entity and the tail entity as elements. For example, the relation information $P^{HA}$ may be expressed by the following equation.

$$p^{HA} = \left[ p_{r_1}^{HA}, p_{r_2}^{HA}, \ldots, p_{r_{|R|}}^{HA} \right] \qquad \text{[Equation 1]}$$

The relation set R as a set having potential relation information of a current entity pair, i.e., potential relation information between the head entity and the tail entity as the element includes relation information $r_i$ to relation information $r_{|R|}$ as the elements.

An i-th element $$p_{r_i}^{HA}$$

of the relation information $P^{HA}$ represents a probability that the relation information of the current entity pair will be i-th relation information $r_i$ of the relation set R.

The second relation prediction network DS-Net predicts relation information $P^{DS}$ included in the head entity <eh> expressed by the feature vector h and the tail entity <et> expressed by the feature vector t.

The relation information $P^{DS}$ is the |R|-dimensional vector defined for the relation set R having the potential relation between the head entity and the tail entity as elements similar to the relation information $P^{HA}$. For example, the relation information $P^{DS}$ may be expressed by the following equation.

$$p^{DS} = \left[ p_{r_1}^{DS}, p_{r_2}^{DS}, \ldots p_{r_{|R|}}^{DS} \right] \qquad \text{[Equation 2]}$$

The relation set R as a set having potential relation information of a current entity pair, i.e., potential relation information between the head entity and the tail entity as the element is a set which is the same as the relation set R described in Equation 1.

An i-th element $$p_{r_i}^{DS}$$

of the relation information $P^{DS}$ represents a probability that the relation information of the current entity pair will be i-th relation information $r_i$ of the relation set R.

Meanwhile, the processor 110 may execute at least one of the first relation prediction network HA-Net and the second relation prediction network DS-Net based on training data to be applied when training the relation extraction model for the input text IN_TXT, i.e., the type of label. The type of label as one of operation parameters for executing the relation extraction model RE_MODEL is a parameter for setting a label set to be applied to a set of the input data IN_TXT during training.

For example, the type of label for training the relation extraction model includes a first label set and a second label set. The first and second label sets are exemplary, and the label type used in an embodiment may further include an additional label set.

In an example, when the type of label is the first label set, the processor 110 may execute the first relation prediction network HA-Net. In an example, when the type of label is the second label set, the processor 110 may execute the second relation prediction network DS-Net. The type of label may be set or adjusted before or during execution of the relation extraction model RE_MODEL.

Here, the second label set may include the labeling bias. That is, the accuracy of the first label set may be higher than that of the second label set. For example, the first label set may include the human annotated label and the second label set may include the distantly supervised label.

The prediction network P_NET may include at least one difference estimation network μ-Net and σ-Net.

In an example, at least one difference estimation network may be determined based on a mathematical model (e.g., a probability model) for difference information between the relation information predicted by the first relation prediction network HA-Net and the second relation prediction network DS-Net. For example, at least one difference estimation network includes difference estimation networks as large as the number of parameters of the mathematical model for the difference information.

For example, the probability distribution for the difference information between the relation information predicted by the first relation prediction network HA-Net and the second relation prediction network DS-Net may follow the log normal distribution, and the prediction network P_NET may include a first difference estimation network u-Net for the average of the difference information and a second difference estimation network o-Net for the standard deviation of the difference information.

The processor 110 executes the first difference estimation network u-Net by inputting the feature vector h of the head entity and the feature vector t of the tail entity. For example, the first difference estimation network μ-Net estimates and outputs first difference information μ according to the following equation.

$$\mu = \left[ \mu_{r_1}, \mu_{r_2}, \ldots \mu_{r_{|R|}} \right] \qquad \text{[Equation 3]}$$

For example, the first difference information u may be an |R|-dimensional vector having, as the element, the average of the differences between the relation information which the first relation prediction network HA-Net and the second relation prediction network DS-Net predict for the head entity and the tail entity, respectively.

That is, an i-th element $\mu_{ri}$ of the first difference information μ means an average value of a prediction difference between the first relation prediction network HA-Net and the second relation prediction network DS-Net for the probability that the relation information between the head entity and the tail entity will be the i-th relation information $r_i$ of the relation set R.

The processor 110 executes the second difference estimation network σ-Net by inputting the feature vector h of the head entity and the feature vector t of the tail entity. For example, the second difference estimation network σ-Net estimates and outputs second difference information σ according to the following equation.

$$\sigma = \left[ \sigma_{r_1}, \sigma_{r_2}, \ldots \sigma_{r_{|R|}} \right] \qquad \text{[Equation 4]}$$

For example, the second difference information σ may be an |R|-dimensional vector having, as the element, the standard deviation of the differences between the relation information which the first relation prediction network HA-Net and the second relation prediction network DS-Net predict for the head entity and the tail entity, respectively.

That is, an i-th element $\sigma_{ri}$ of the second difference information σ means a standard deviation value of a prediction difference between the first relation prediction network HA-Net and the second relation prediction network DS-Net for the probability information between the head entity and the tail entity will be the i-th relation information $r_i$ of the relation set R.

The first relation prediction network HA-Net calculates a loss term $L^{HA}$ to be described below according to an error between the first label set and the output $P^{HA}$ of the first relation prediction network HA-Net by using the first label set as a ground truth (GT).

The second relation prediction network DS-Net calculates a loss term $L^{DS}$ to be described below according to the error between the second label set and the output $P^{DS}$ of the second relation prediction network DS-Net by using the second label set as the ground truth (GT).

At least one difference estimation network μ-Net and σ-Net calculates the loss term $L^{DS\text{-}HA}$ to be described below based on the outputs $P^{HA}$ and $P^{DS}$ of the first and second relation prediction networks HA-Net and DS-Net and the outputs μ and σ of the respective difference estimation networks. For example, the loss term $L^{DS\text{-}HA}$ to be described below may be calculated according to the error between the output μ of the first difference estimation network u-Net and the output σ of the second difference estimation network σ-Net.

In an example, the loss function for training the relation extraction model RE_MODEL is determined based on the loss term $L^{HA}$, the loss term $L^{DS}$, and the loss term $L^{DS\text{-}HA}$. In an example, the loss function for training the relation extraction model RE_MODEL is set to a sum of the loss term $L^{HA}$ and the loss term $L^{DS\text{-}HA}$ or a sum of the loss term $L^{DS}$ and the loss term $L^{DS\text{-}HA}$ according to the type of label.

Hereinafter, the relation extraction method according to an embodiment based on the relation extraction model RE_MODEL will be described with reference to FIG. 5.

FIG. 5 is a flowchart of a method for relation extraction according to an embodiment.

The relation extraction method according to an embodiment may include step S1 of determining the word corresponding to the head entity $e_h$ and the word corresponding to the tail entity $e_t$ among a series of words of the input text IN_TXT by executing the feature encoder F_ENC.

In step S1, the processor 110 may extract at least one entity pair from the input text IN_TXT. For example, the head entity and the tail entity are expressed as the feature vectors of the words corresponding thereto, respectively.

The relation extraction method according to an embodiment includes step S2 of predicting, by a first relation prediction network HA-Net, first relation information $P^{HA}$ included in an entity pair of the input text IN_TXT based on a first label set for pre-defined relation information, step S3 of predicting, by a second relation prediction network DS-Net, second relation information $P^{DS}$ included in the entity pair of the input text IN_TXT based on a second label set including a labeling bias for the pre-defined relation information, step S4 of estimating, by at least one difference estimation network u-Net and σ-Net for a disagreement probability distribution of the relation information, difference information μ and σ between the first relation information $P^{HA}$ and the second relation information $P^{DS}$, and step S5 of training the first relation prediction network HA-Net, the second relation prediction network DS-Net, and at least one difference estimation network μ-Net and σ-Net by using a loss function based on the difference information.

In step S2, the processor 110 is configured to predict the first relation information $P^{HA}$ included in the entity pair of the input text IN_TXT by the first relation prediction network HA-Net based on the first label set for the pre-defined relation information.

In step S2, the processor 110 predicts the first relation information $P^{HA}$ included in the entity pair determined in step S1 by executing the first relation prediction network HA-Net of the relation extraction model RE_MODEL based on the first label set for the pre-defined relation information. Here, the first label set for the pre-defined relation information as pre-defined relation information for a plurality of entity pairs includes a human annotated label.

In step S3, the processor 110 is configured to predict the second relation information $P^{DS}$ included in the entity pair of the input text IN_TXT by the second relation prediction network DS-Net based on the second label set including the labeling bias for the pre-defined relation information.

In step S3, the processor 110 predicts the second relation information $P^{DS}$ included in the entity pair determined in step S1 by the second relation prediction network DS-Net of the relation extraction model RE_MODEL based on the second label set including the labeling bias for the pre-defined relation information. Here, the second label set including the labeling bias for the pre-defined relation information as the pre-defined relation information for the plurality of entity pairs includes a distantly supervised label.

In step S4, the processor 110 is configured to estimate the difference information μ and σ between the first relation information $P^{HA}$ and the second relation information $P^{DS}$ by at least one difference estimation network μ-Net and σ-Net for the disagreement probability distribution of the relation information.

In an example, the disagreement probability distribution is a log normal distribution for the ratio of the first relation information $P^{HA}$ and the second relation information $P^{DS}$, and at least one difference estimation network μ-Net and σ-Net includes a first difference estimation network μ-Net for an average of the log normal distribution and a second difference estimation network σ-Net for a standard deviation for the log normal distribution.

In step S4, the processor 110 estimates the difference information μ and σ between the first relation information $P^{HA}$ and the second relation information $P^{DS}$ by executing at least one difference estimation network u-Net and o-Net of the relation extraction model RE_MODEL.

In an example, steps S2 to S4 may be executed sequentially or in parallel simultaneously in order or in a different order.

In step S5, the processor 110 is configured to train the first relation prediction network HA-Net, the second relation prediction network DS-Net, and the at least one difference estimation network μ-Net and σ-Net by using the loss function based on the difference information.

In step S5, the processor 110 calculates a loss term $L^{HA}$ according to an error between the first label set and the output $P^{HA}$ of the first relation prediction network HA-Net by using the first label set as a ground truth (GT).

$$L^{HA} = \sum_{r \in R_{h,t}} \log p_r^{HA} + \sum_{r \notin R_{h,t}} \log\left(1 - p_r^{HA}\right) \qquad \text{[Equation 5]}$$

Hereinafter, $R_{h,t}$ means a set of a relation which is a ground truth for the entity pair of the head entity h and the tail entity t.

In step S5, the processor 110 calculates a loss term $L^{DS}$ according to an error between the second label set and the output $P^{DS}$ of the second relation prediction network DS-Net by using the second label set as the ground truth (GT).

$$L^{DS} = \sum_{r \in R_{h,t}} \log p_r^{DS} + \sum_{r \notin R_{h,t}} \log\left(1 - p_r^{DS}\right) \qquad \text{[Equation 6]}$$

In step S5, at least one difference estimation network μ-Net and σ-Net calculates a loss term $L^{DS\text{-}HA}$ based on the outputs $P^{HA}$ and $P^{DS}$ of the first and second relation prediction networks HA-Net and DS-Net and the outputs μ and σ of the respective difference estimation networks.

The loss term $L^{DS\text{-}HA}$ is a loss term for the difference information, and the loss term $L^{DS\text{-}HA}$ is defined as a function based on the ratio of the first relation information $P^{HA}$ and the second relation information $P^{DS}$, and the difference information $\mu$ and $\sigma$.

Here, the loss term $L^{DS\text{-}HA}$; is set to have a low value when the difference estimation networks $\mu$-Net and $\sigma$-Net excellently estimate the difference between the outputs of the first and second relation prediction networks HA-Net and DS-Net. That is, the loss term $L^{DS\text{-}HA}$ becomes smaller as the outputs $\mu$ and $\sigma$ of the difference estimation networks $\mu$-Net and $\sigma$-Net meet the difference between the outputs of the first and second relation prediction networks HA-Net and DS-Net.

For example, it may be assumed that in order to measure the difference between the outputs $P^{HA}$ and $P^{DS}$ of two relation prediction networks HA-Net and DS-Net, a ratio may $P^{DS}/P^{HA}$ of two outputs follows the log normal distribution, and the loss term $L^{DS\text{-}HA}$ use negative log-likelihood.

Here, the difference between the outputs $P^{HA}$ and $P^{DS}$ is determined for each element of an output ($P^{HA}$ and $P^{DS}$) vector. That is, it is assumed that a ratio $$p_{r_i}^{DS}/p_{r_i}^{HA}$$

of a vector element corresponding to a probability value for an i-th relation type $r_i$ of the output ($P^{HA}$ and $P^{DS}$) vector follows a log normal distribution Lognormal($\mu_{ri}$, $\sigma_{ri}$), and the loss term $L^{DS\text{-}HA}$ for the difference is set in the loss function L of the relation extraction model RE_MODEL.

$$L^{DS\text{-}HA} = \sum_{r \in R_{h,t}} \frac{1}{2}\left(\frac{\log\frac{p_r^{DS}}{p_r^{HA}} - \mu_r}{\sigma_r}\right)^2 + \log\frac{p_r^{DS}}{p_r^{HA}} + \log\sigma_r \quad \text{[Equation 7]}$$

Here, $\mu_r$, $\sigma_r$ which is the parameter of the log normal distribution is estimated through the difference estimation network. Specifically, the difference estimation networks $\mu$-Net and $\sigma$-Net are arranged in the prediction network P_NET to estimate $\mu_r$ and $\sigma_r$, respectively.

A model structure of the difference estimation networks $\mu$-Net and $\sigma$-Net may be configured similarly to the first relation prediction network HA-Net. In an example, the difference estimation networks $\mu$-Net and $\sigma$-Net may limit a range of $\mu_r$ to $[-1,1]$ and the range of $\sigma_r$ to $[0, \infty]$ by using tanh and softplus functions, respectively as a final activation function.

In an example, the loss function of the relation extraction model RE_MODEL calculated in step S5 is determined based on the loss term $L^{HA}$, the loss term $L^{DS}$, and the loss term $L^{DS\text{-}HA}$.

Step S5 may include a step of determining the loss function based on the type of label for the relation information included in the entity pair of the input text IN_TXT. In an example, the loss function for training the relation extraction model RE_MODEL is set to a sum of the loss term $L^{HA}$ and the loss term $L^{DS\text{-}HA}$ or a sum of the loss term $L^{DS}$ and the loss term $L^{DS\text{-}HA}$ according to the type of label.

For example, the loss function L is defined as follows for the first relation information $P^{HA}$ output from the first relation prediction network HA-Net by the first label set annotated by the human.

$$L = L^{HA} + \lambda L^{DS\text{-}HA} \quad \text{[Equation 8]}$$

Here, $\lambda$ represents a constant indicating a weight for the loss term $L^{DS\text{-}HA}$.

For example, the loss function is defined as follows for the second relation information $P^{DS}$ output from the second relation prediction network DS-Net by the second label set created by distant supervising.

$$L = L^{DS} + \lambda L^{DS\text{-}HA} \quad \text{[Equation 9]}$$

Here, $\lambda$ represents a constant indicating a weight for the loss term $L^{DS\text{-}HA}$.

Meanwhile, the above-described loss function is exemplary, and is not limited thereto, and may adopt various schemes of loss functions.

In step S5, the processor 110 updates parameters of the feature encoder F_ENC, the first relation prediction network HA-Net, the second relation prediction network DS-Net, and at least one difference estimation network $\mu$-Net and $\sigma$-Net based on an operation result of the loss function L (e.g., as utilizing SDG, Adam, RMSProp, etc.).

In an example, steps S4 and S5 may be executed for the relation type $r_i$ of the first relation information $P^{HA}$ and the second relation information $P^{DS}$ for the entity pair of the input text IN_TXT. For example, steps S4 and S5 may be executed repeatedly as large as the number IRI of relation types $r_i$ for the entity pair of the input text IN_TXT, i.e., the number of dimensions of the feature vector of the entity. For example, steps S4 and S5 may be executed in parallel by a vector operation for the relation type $r_i$ for the entity pair of the input text IN_TXT.

The relation extraction method according to an embodiment may further include step S6 of estimating the relation information included in the entity pair of the second input text by the first relation prediction network HA-Net trained in step S5.

In step S6, the processor 110 obtains the entity pair of the second input text. For example, in step S6, the processor 110 may extract the entity pair which is a relation extraction target from the second input text by executing the feature encoder F_ENC, or obtain the entity pair from the memory 120 storing a pre-extracted entity pair or the external device through the communication unit.

Subsequently, the processor 110 executes the first relation prediction network HA-Net trained in step S5, and outputs the vector shown in Equation 1 as the relation information $P^{HA}$ included in the entity pair of the second input text. Here, an i-th element $$p_{r_i}^{HA}$$

of the vector indicating the relation information $P^{HA}$ represents a probability that the relation information of the entity pair will be $r_i$.

In step S6, the processor 110 determines relation information corresponding to an element having a largest probability value among the elements of the acquired relation information ($P^{HA}$) vector as the relation information of the relevant entity pair. For example, when a value of a j-th element $$p_{r_j}^{HA}$$

is the largest, the processor 110 determines the relation information of the entity pair of the second input text as a relation indicated by $r_j$.

According to an embodiment, human annotated data may be directly used for training. The resulting effect may be largely divided into two, and described.

First, when the amount of the human annotated data increases, larger performance enhancement may be expected. When the human annotated data is utilized only as statistical information, there is no large change in the statistical information even though there is added data if data of a predetermined degree or more is collected. On the contrary, according to an embodiment, since the added data is directly used for model training, additional performance enhancement may be expected. among the automatically created data less affects the training and accurate data largely affects the training to more efficiently use the noisy data for the training.

Meanwhile, the relation extraction technique according to an embodiment may be used for automatically constructing or expanding a large-scale knowledgebase. The knowledgebase as a database storing accumulated knowledge is one of required components of an expert system such as a search engine or a question answering system, and the relation extraction technique according to an embodiment is usable for various fields such as the search engine, a chatbot, and the question answering system.

Meanwhile, the training method according to an embodiment is applicable to most fields using weakly supervised learning. The weakly supervised learning is a method that obtains a large amount of data by a method which may be inaccurate and learns the model by using the same. The training method according to an embodiment is applied to various fields to which the weakly supervised learning is applied to enhance the accuracy.

The method according to an embodiment of the present invention described above can be embodied as computer readable codes on a medium in which a program is recorded. The computer readable medium as a non-transitory recording medium includes all kinds of recording devices storing data which may be deciphered by a computer system. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like.

The aforementioned description of the embodiment of the present invention is used for exemplification, and it can be understood by those skilled in the art that the present invention can be easily modified in other detailed forms without changing the technical spirit or requisite features of the present invention. Therefore, it should be appreciated that the aforementioned embodiments are illustrative in all aspects and are not restricted. For example, respective constituent elements described as single types can be distributed and implemented, and similarly, constituent elements described to be distributed can also be implemented in a coupled form.

The scope of the present invention is represented by claims to be described below rather than the detailed description, and it is to be interpreted that the meaning and scope of the claims and all the changes or modified forms derived from the equivalents thereof come within the scope of the present invention.

The present invention is derived from a research conducted as a part of the next-generation information and computing technology development project (Project No. 1711116328, Project Name: Development of Web Scale Big Complex Data Integration and Inference Source Technology) and the cloud robot complex artificial intelligence development project (Project No: 1711117039, Project Name: Development of Cloud Robot Intelligence Augmentation, Sharing, and Framework Technology of Integrating and Advancing Intelligence of Multiple Robots).

Many modifications to the above embodiments may be made without altering the nature of the invention. The dimensions and shapes of the components and the construction materials may be modified for particular circumstances. While various embodiments have been described above, it should be understood that they have been presented by way of example only, and not as limitations.

The invention claimed is:

1. A method for relation extraction (RE) from a text, the method comprising:
   predicting, by a first relation prediction network, first relation information included in an entity pair of an input text based on a first label set for pre-defined relation information;
   predicting, by a second relation prediction network, second relation information included in the entity pair of the input text based on a second label set including a labeling bias for the pre-defined relation information;
   estimating, by at least one difference estimation network for a disagreement probability distribution of relation information, difference information between the first relation information and the second relation information; and
   training the first relation prediction network, the second relation prediction network, and the at least one difference estimation network by using a loss function based on the difference information.

2. The method of claim 1, wherein the entity pair of the input text corresponds to a combination of a head entity and a tail entity, and
   wherein the method further includes determining a word corresponding to the head entity and a word corresponding to the tail entity among a series of words of the input text by executing a feature encoder.

3. The method of claim 2, wherein the head entity and the tail entity are expressed as feature vectors of the words corresponding thereto, respectively.

4. The method of claim 1, wherein the first label set includes a human annotated label, and
   the second label set includes a distantly supervised label.

5. The method of claim 1, wherein the first relation prediction network and the second relation prediction network are configured to share an initial weight with each other.

6. The method of claim 1, wherein the loss function includes a loss term for the difference information, and
   the loss term for the difference information is a function of a ratio of the first relation information and the second relation information, and the difference information.

7. The method of claim 1, wherein the training includes determining the loss function based on a type of label for the relation information included in the entity pair of the input text.

8. The method of claim 1, wherein the disagreement probability distribution is a log normal distribution for a ratio of the first relation information and the second relation information, and
   the at least one difference estimation network includes a first difference estimation network for an average of the log normal distribution and a second difference estimation network for a standard deviation of the log normal distribution.

9. The method of claim 1, further comprising:

estimating, by the first relation prediction network trained by the training, relation information included in the entity pair of a second input text.

10. A computer readable non-transitory recording medium storing a computer program including at least one command configured to allow a computer to execute a method for relation extraction from a text of claim 1.

11. An apparatus for relation extraction from a text, the apparatus comprising:

a processor; and a memory operably connected to the processor and storing at least one code performed by the processor, wherein when the memory is executed through the processor, the memory stores a code which allows the processor to predict, by a first relation prediction network, first relation information included in an entity pair of an input text based on a first label set for pre-defined relation information, predict, by a second relation prediction network, second relation information included in the entity pair of the input text based on a second label set including a labeling bias for the pre-defined relation information, estimate, by at least one difference estimation network for a disagreement probability distribution of relation information, difference information between the first relation information and the second relation information, and train the first relation prediction network, the second relation prediction network, and the at least one difference estimation network by using a loss function based on the difference information.

12. The apparatus of claim 11, wherein the entity pair of the input text corresponds to a combination of a head entity and a tail entity, and when the memory is executed through the processor, the memory stores a code configured to allow the processor to determine a word corresponding to the head entity and a word corresponding to the tail entity among a series of words of the input text by executing a feature encoder.

13. The apparatus of claim 11, wherein the first label set includes a human annotated label, and the second label set includes a distantly supervised label.

14. The apparatus of claim 11, wherein the loss function includes a loss term for the difference information, and the loss term for the difference information is a function of a ratio of the first relation information and the second relation information, and the difference information.

15. The apparatus of claim 11, wherein when the memory is executed through the processor, the memory stores a code configured to allow the processor to determine the loss function based on a type of label for relation information included in the entity pair of the input text.

16. The apparatus of claim 11, wherein the disagreement probability distribution is a log normal distribution for a ratio of the first relation information and the second relation information, and the at least one difference estimation network includes a first difference estimation network for an average of the log normal distribution and a second difference estimation network for a standard deviation of the log normal distribution.

17. The apparatus of claim 12, wherein when the memory is executed through the processor, the memory stores a code configured to allow the processor to estimate the relation information included in the entity pair of a second input text by the trained first relation prediction network.

* * * * *